United States Patent
Inuzuka et al.

(10) Patent No.: US 11,303,172 B2
(45) Date of Patent: Apr. 12, 2022

(54) ROTOR FOR ROTATING ELECTRICAL MACHINE AND ROTOR CORE SUPPORT STRUCTURE FOR ROTATING ELECTRICAL MACHINE

(71) Applicants: Nissan Motor Co., Ltd., Yokohama (JP); Renault S.A.S., Boulogne-Billancourt (FR)

(72) Inventors: Kenta Inuzuka, Kanagawa (JP); Hirokazu Matsuzaki, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 86 days.

(21) Appl. No.: 16/979,011

(22) PCT Filed: Mar. 9, 2018

(86) PCT No.: PCT/IB2018/000373
§ 371 (c)(1),
(2) Date: Sep. 8, 2020

(87) PCT Pub. No.: WO2019/171099
PCT Pub. Date: Sep. 12, 2019

(65) Prior Publication Data
US 2020/0412191 A1 Dec. 31, 2020

(51) Int. Cl.
*H02K 1/28* (2006.01)
*H02K 1/27* (2022.01)
*H02K 1/276* (2022.01)

(52) U.S. Cl.
CPC ............... *H02K 1/28* (2013.01); *H02K 1/276* (2013.01)

(58) Field of Classification Search
CPC ........ H02K 1/28; H02K 1/276; H02K 1/2766; H02K 7/003
See application file for complete search history.

(56) References Cited

U.S. PATENT DOCUMENTS

| 4,987,330 A | * | 1/1991 | Murphy | H02K 1/28 310/211 |
| 2013/0293057 A1 | * | 11/2013 | Naito | H02K 1/28 310/216.123 |

FOREIGN PATENT DOCUMENTS

| JP | 2009-60738 A | 3/2009 |
| JP | 5025258 B2 | 9/2012 |

(Continued)

*Primary Examiner* — Thomas Truong
(74) *Attorney, Agent, or Firm* — Young Basile Hanlon & MacFarlane, P.C.

(57) ABSTRACT

A rotor of a rotary electric machine includes a rotor shaft, a rotor core fixedly supported on an outer circumference of the rotor shaft. The rotor shaft is provided, in a cross section perpendicular to the rotation axis, with a first outer edge portion projecting in a radial direction of the rotor shaft, and a second outer edge portion arranged in line with the first outer edge portion one after the other in a circumferential direction of the rotor shaft. The rotor core has a core insertion hole into which the rotor shaft is inserted, and a shaft holding portion on an inner circumference forming the core insertion hole, the shaft holding portion being configured to hold the first outer edge portion from the opposite sides in the circumferential direction of the rotor shaft. The shaft holding portion is in a non-contact state with the second outer edge portion.

10 Claims, 7 Drawing Sheets

(56) References Cited

FOREIGN PATENT DOCUMENTS

| JP | 2014-033585 A | 2/2014 |
|----|---------------|--------|
| JP | 2014-176218 A | 9/2014 |

* cited by examiner

US 11,303,172 B2

ROTOR FOR ROTATING ELECTRICAL MACHINE AND ROTOR CORE SUPPORT STRUCTURE FOR ROTATING ELECTRICAL MACHINE

TECHNICAL FIELD

The present invention relates to a rotor for a rotating electrical machine that includes a rotor core fixedly supported to an outer periphery of a rotor shaft, and a rotor core support structure for the rotating electrical machine.

BACKGROUND ART

JP5025258B discloses a technique for a rotor for a rotating electrical machine that includes a rotor core fixedly supported to an outer periphery of a rotor shaft or a rotor hub, the rotor core includes a plurality of permanent magnets, and the rotor shaft or the rotor hub is a separate body from the rotor core. The technique is as follows. The rotor core includes a plurality of ribs at a middle portion between a core inner peripheral portion and a core outer peripheral portion, the core inner peripheral portion forms hub insertion holes, the core outer peripheral portion forms permanent magnet support holes, and the plurality of ribs divide punched holes in a circumferential direction. The rib has a rib one-end portion coupled to the core inner peripheral portion and a rib other-end portion coupled to the core outer peripheral portion, the rib one-end portion and the rib other-end portion are formed to be mutually displaced in the circumferential direction of the rotor core, and the rib includes two curving portions between the rib one-end portion and the rib other-end portion (paragraph 0016).

SUMMARY OF INVENTION

The technique disclosed in the above-described document can reduce a stress concentration that occurs on the core outer peripheral portion when the rotor core is secured to the outer periphery of the rotor hub, specifically, a stress concentration that occurs at corner portions of the core outer peripheral portion where the permanent magnet support holes are formed by circular press-fitting or shrinkage fastening of the rotor core, thus enhancing durability of the rotor core. However, since the rotor core is secured to the rotor hub by the shrinkage fastening and a rotor core holding force in transmitting a torque between the rotor hub and the rotor core is generated by only this shrinkage fastening, the rotor hub needs to have a large diameter for obtaining the required holding force, and the entire rotor tends to be large-sized.

The object of the present invention is to provide a rotor for a rotating electrical machine and a rotor core support structure for the rotating electrical machine in consideration of the problem described above.

According to an aspect of the present invention, a rotor for a rotating electrical machine including a rotor shaft and a rotor core fixedly supported to an outer periphery of the rotor shaft is provided. The rotor shaft includes a first outer circumference and a second outer circumference on a cross section perpendicular to a rotation axis, the first outer circumference projecting in a radial direction of the rotor shaft, the second outer circumference being arranged in a circumferential direction of the rotor shaft with respect to the first outer circumference, and the second outer circumferences being disposed alternately with the first outer circumference. The rotor core includes a core insertion hole into which the rotor shaft is inserted, and a shaft holding portion on an inner peripheral portion on which the core insertion hole is formed, the shaft holding portion configured to hold the first outer circumference from both sides in the circumferential direction of the rotor shaft. The shaft holding portion is non-contact with the second outer circumference.

According to another aspect of the present invention, a rotor core support structure for a rotating electrical machine is provided.

DESCRIPTION OF EMBODIMENTS

The following describes embodiments of the present invention with reference to the drawings.

Figure 1:
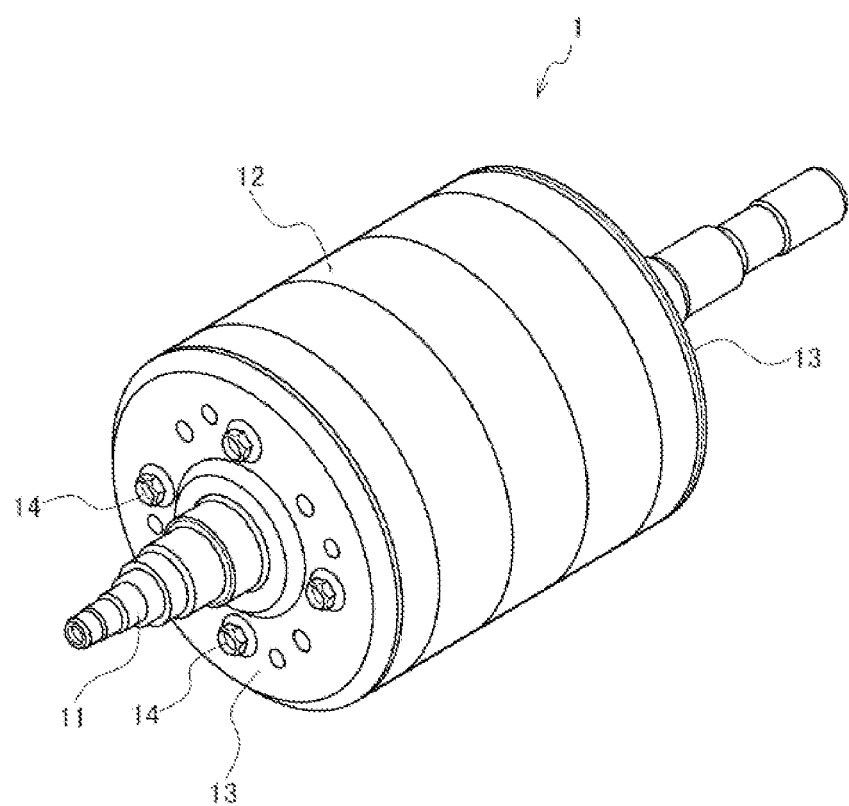
FIG. 1 is a perspective view illustrating an appearance of a rotor for a rotating electrical machine according to one embodiment of the present invention.

FIG. 1 illustrates an appearance of a rotor 1 for a rotating electrical machine according to one embodiment of the present invention in a state where the rotor 1 is viewed from obliquely upward.

The rotor 1 includes a rotor shaft 11, a rotor core 12, and a pair of end plates 13. The rotor shaft 11 forms a rotation axis of a rotating electrical machine or a motor to which the rotor 1 is applied. The rotor core 12 is fixedly supported to an outer periphery of the rotor shaft 11, and formed of a plurality of electromagnetic steel plates, which are mutually laminated, in this embodiment. The number of layers of the electromagnetic steel plate constituting the rotor core 12 is not limited to a plurality but may be one. Furthermore, the electromagnetic steel plate of each layer constituting the rotor core 12 does not need to be a circular single body, and may be formed by combining circumferentially divided arc-shaped parts in an annular shape. The end plates 13 are formed of a non-magnetic material, disposed on both sides of the rotor core 12 in its axial direction, and fastened with a bolt-and-nut 14 to sandwich the plurality of electromagnetic steel plates constituting the rotor core 12.

In this embodiment, the rotor 1 includes a plurality of permanent magnets, and is arranged inside a stator (not illustrated) in a radial direction of the stator that includes electromagnetic coils, thus constituting a permanent magnet synchronous motor. The rotating electrical machine or the motor to which the rotor 1 is applied may be an electric motor operated only as a motor, or may be a motor-generator that doubles as a motor and an electric generator. Then, its use includes, for example, a driving source of an electric vehicle, a hybrid vehicle, or the like. The motor torque is transmitted to driving wheels of the vehicle, and the vehicle can be impelled forward or rearward. In this embodiment, while the rotor 1 constitutes the permanent magnet synchronous motor, the motor to which the rotor 1 is applicable is not limited to this, and may be a winding field type synchronous motor or an induction motor. The arrangement of the permanent magnets in the case of the permanent magnet synchronous motor may be an embedded type, or may be a surface type. That is, the rotor 1 can be adapted to the rotating electrical machine of every configuration where the rotor core 12 is fixedly supported to the outer periphery of the rotor shaft 11.

Figure 2:
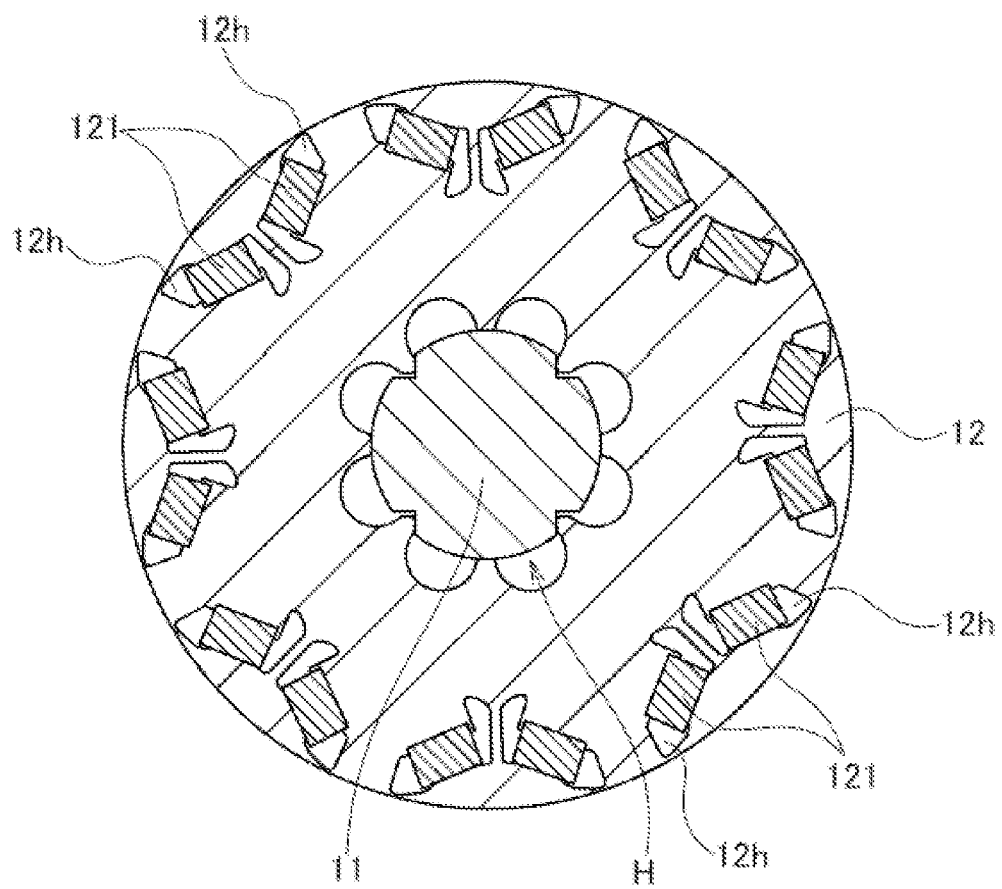
FIG. 2 is a cross-sectional view schematically illustrating an overall configuration of the rotor.

FIG. 2 illustrates a configuration of a portion of the rotor 1 where the rotor core 12 is included on a cross section perpendicular to a rotation axis of the motor (hereinafter simply referred to as a "rotation axis").

The rotor shaft 11 has a columnar shape or an elongated shape as a whole, and is in a state of being inserted into a shaft insertion hole H of the rotor core 12 concentrically with the rotor core 12. The rotor core 12 has an annular shape as a whole, and includes a plurality of permanent magnet insertion holes 12h formed to be arranged in a circumferential direction of the rotor core 12 on its outer peripheral portion. A plurality of permanent magnets 121 included in the rotor core 12 are inserted into the respective permanent magnet insertion holes 12h to be secured to the rotor core 12. By engaging a shaft holding portion 122 provided to an inner peripheral portion of the rotor core 12 with an outer edge portion (first outer circumference 111) of the rotor shaft 11, the rotor core 12 is fixedly supported to the outer periphery of the rotor shaft 11.

In this embodiment, the two permanent magnets 121 are disposed per pole, the rotor 1 constitutes an 8-pole motor, and the rotor core 12 includes the 16 permanent magnets 121 in total. A pair of the permanent magnets 121 constitutes one pole, and are arranged to form a V shape expanding outward in a radial direction of the rotor core 12. However, the total number of the permanent magnets 121, the number per pole, and the arrangement in the rotor core 12 are not limited to them, and the number of poles can be four, or the number of the permanent magnets 121 per pole can be one.

Figure 3:
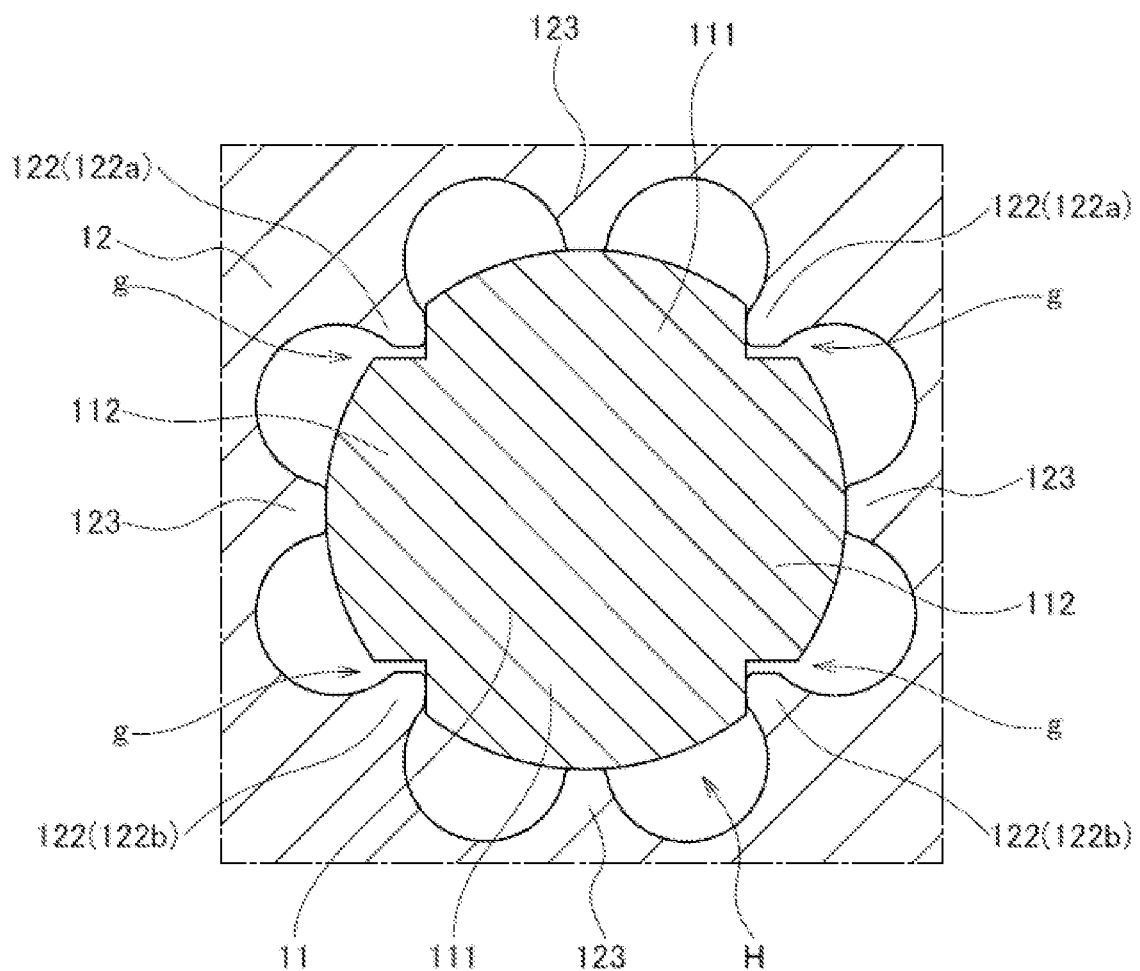
FIG. 3 is a partial cross-sectional view schematically illustrating a configuration of a rotor shaft and its periphery of the rotor.

FIG. 3 is a partially enlarged view of FIG. 2, and schematically illustrates a configuration of the rotor shaft 11 and its periphery of the rotor 1.

The rotor shaft 11 includes first outer circumferences 111 (first outer edge portions) and second outer circumferences 112 (second outer edge portions) on its outer peripheral portion on a cross section perpendicular to the rotation axis. The first outer circumference 111 projects in a radial direction of the rotor shaft 11. The second outer circumference 112 is arranged in a circumferential direction of the rotor shaft 11 with respect to the first outer circumference 111, and disposed alternately with the first outer circumference 111. Here, the first outer circumference 111 "projects" simply means to form a surface with which the shaft holding portion 122 of the rotor core 12 is engaged when the rotor core 12 is secured to the outer periphery of the rotor shaft 11, and clearly extending radially outward compared with another portion of the outer peripheral portion (for example, the second outer circumference 112) is not necessary. In this meaning, the first outer circumference 111 is not specifically restricted on its height, and can have various forms such as a bulge portion, a raised portion, a diameter-expanded portion, a step portion, and a protrusion, in addition to the projecting portion. Furthermore, the first outer circumference 111 may include cutouts extending in the axial direction of the rotor shaft 11 rather than the projecting portion in the cross section perpendicular to the rotation axis. This is because a surface defining the cutout can become the "surface for engagement."

In this embodiment, the "first outer circumferences" 111 are disposed at axially symmetrical positions with respect to the rotation axis one by one, two in total, and the "second outer circumferences" 112 are disposed between the two first outer circumferences 111 one by one, also two in total, alternately with the first outer circumferences 111 in the circumferential direction. In this embodiment, for convenience of manufacturing the rotor core 12, specifically, considering rotary lamination of the electromagnetic steel plate manufactured with variations in dimension and magnetic property corresponding to portions of a roll material, not only the first outer circumference 111 but also the second outer circumference 112 has the form of the "projecting portion" similarly to the first outer circumference 111. That is, in this embodiment, while the rotor shaft 11 includes the projecting portions, four in total, having the same shape every 90 degrees, the first outer circumference 111 and the second outer circumference 112 are distinguished as the "projecting portions" having different characteristics depending on a relation of contact or non-contact with the shaft holding portion 122 in the state where the rotor core 12 is fixed. Furthermore, the first outer circumference 111 and the second outer circumference 112 not only each include one projecting portion, but also can apparently include a plurality of projecting portions, in other words, can be formed as a group of the plurality of projecting portions. This is achieved by, for example, providing grooves or cutouts on outer peripheries of the first outer circumference 111 and the second outer circumference 112 in the cross section of FIG. 3 axially viewing the rotor shaft 11. The first outer circumference 111 and the second outer circumference 112 are understood to each include a plurality of projecting portions, project in the radial direction of the rotor shaft 11 as a whole, and alternately arranged in the circumferential direction.

The rotor core 12 has an annular shape as a whole, and includes one or a pair of shaft holding portions 122 for each first outer circumference 111 of the rotor shaft 11 on the inner peripheral portion where the shaft insertion hole H is formed. The rotor core 12 is secured to the outer periphery of the rotor shaft 11 by holding the first outer circumference 111 from both sides in the circumferential direction of the rotor shaft 11 by the shaft holding portion 122. In this embodiment, the shaft holding portion 122 includes a pair of inwardly projecting portions 122a and a pair of inwardly projecting portions 122b inwardly extending in the radial direction of the rotor core 12 for respective first outer circumferences 111. The shaft holding portion 122, that is, the pairs of inwardly projecting portions 122a and 122b are engaged with the first outer circumferences 111, and each of the shaft holding portions 122 is non-contact with the second outer circumferences 112 of the rotor shaft 11 in the state where the rotor core 12 is secured to the rotor shaft 11. Here, the shaft holding portion 122 is "non-contact" with the second outer circumferences 112 means that when the shaft holding portion 122 is engaged with the first outer circumferences 111 of the rotor shaft 11 and inwardly projecting portions 122a and 122b of the respective pairs are pushed by the first outer circumferences 111 in mutually separating directions, deformation of the shaft holding portion 122 by the first outer circumferences 111 is not restricted by the second outer circumferences 112. This means that "non-contact" includes not only a case where a visually confirmable clear gap g is present between the shaft holding portion 122 and the second outer circumference 112 as illustrated in FIG. 3, but also a case where the shaft holding portion 122 is substantially in the non-contact state where the shaft holding portion 122 contacts the second outer circumference 112 to the extent without the restraint.

In this embodiment, since the two first outer circumferences 111 are disposed to the rotor shaft 11, two pairs of (that is, four) inwardly projecting portions 122a and 122b in total are disposed as the shaft holding portion 122 of the rotor core 12, one pair for each first outer circumference 111. However, the numbers of the first outer circumferences 111 and the shaft holding portions 122 are not limited to this, the numbers can be appropriately set considering the convenience of manufacturing the rotor core 12 and the like. Furthermore, it is not necessary to cause the number of the shaft holding portions 122 to match or correspond to the number of the first outer circumferences 111, and the number of the shaft holding portions 122 may be smaller than that of the first outer circumferences 111. For example, a configuration where, for the rotor shaft 11 illustrated in FIG. 3, the number of the shaft holding portions 122 (the number of pairs of the inwardly projecting portions 122a and 122b) is one, and the shaft holding portion 122 is engaged with any one of the outer circumferences among the four outer circumferences (two first outer circumferences 111 and two second outer circumferences 112) can be employed.

Figure 4:
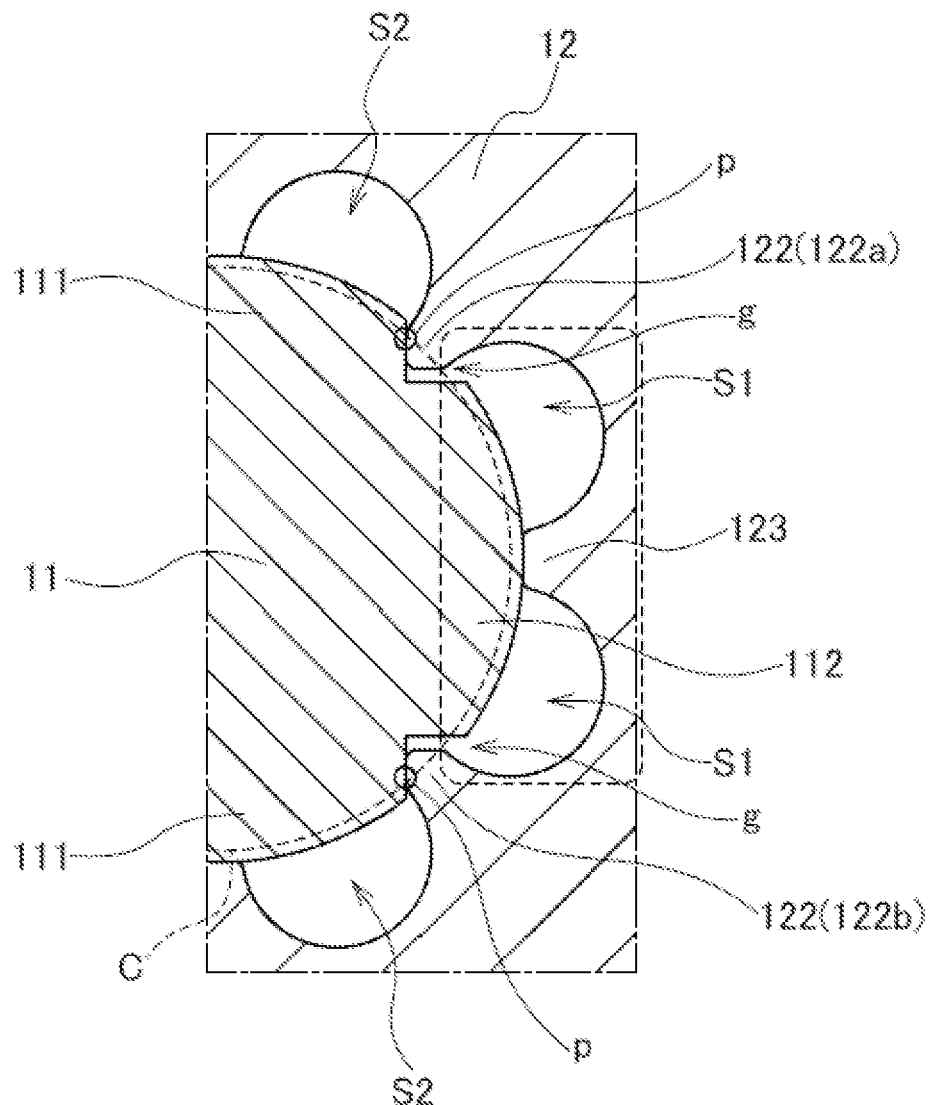
FIG. 4 is a partial cross-sectional view schematically illustrating a configuration between different shaft holding portions of the rotor.

FIG. 4 is a partially enlarged view of FIG. 3, and mainly illustrates the configuration of the rotor core 12 between the different shaft holding portions 122.

Figure 5:
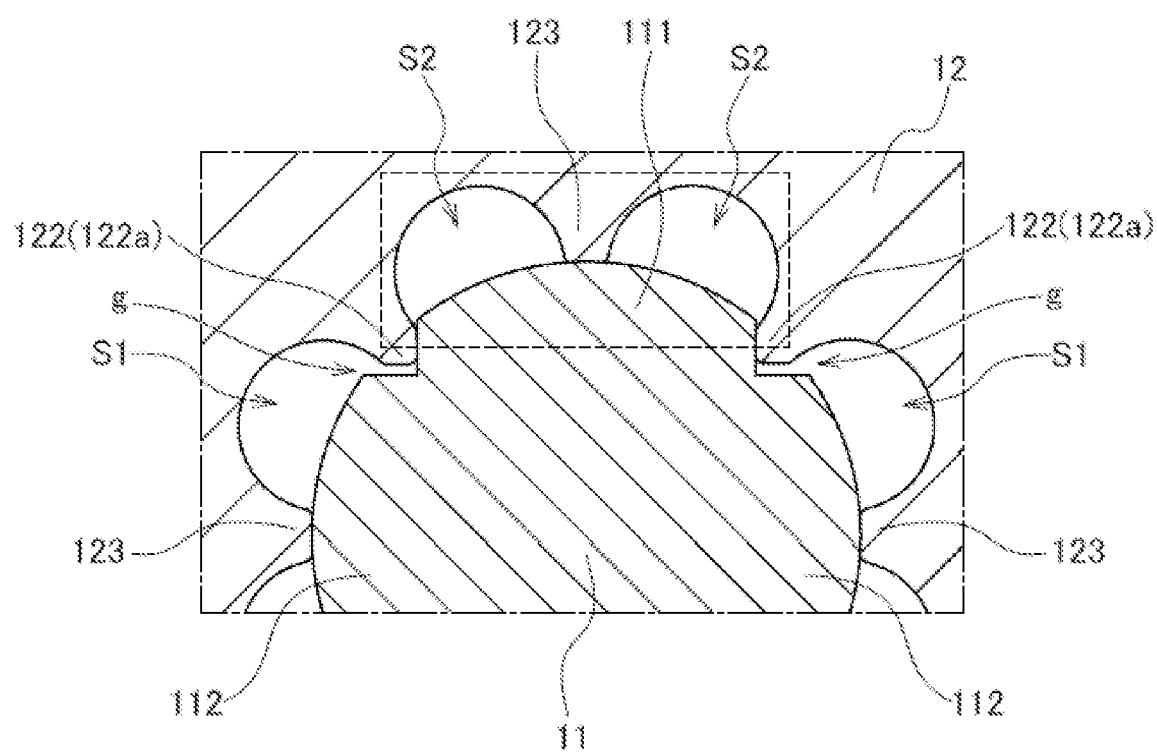
FIG. 5 is a partial cross-sectional view schematically illustrating a configuration between a pair of inwardly projecting portions included as the shaft holding portion in the rotor.

FIG. 5 is a partially enlarged view of FIG. 3, and mainly illustrates the configuration of the rotor core 12 between the inwardly projecting portions 122a (122b) of each pair.

As illustrated in FIG. 4, the rotor core 12 includes a recess S1 on the inner peripheral portion between the shaft holding portion 122 (the inwardly projecting portion 122a of one pair) engaged with one of the two first outer circumferences 111 included in the rotor shaft 11 and the shaft holding portion 122 (the inwardly projecting portion 122b of the other pair) engaged with the other. FIG. 4 illustrates the portion where the recess S1 is provided by a dotted line. The recess S1 forms a gap between the rotor shaft 11 and the rotor core 12. The recess S1 is disposed between the different shaft holding portions 122.

Furthermore, as illustrated in FIG. 5, the rotor core 12 includes recesses S2 on the inner peripheral portion between the inwardly projecting portions (FIG. 5 illustrates the one pair of inwardly projecting portions 122a) of each pair for each shaft holding portion 122 engaged with the first outer circumference 111 of the rotor shaft 11. FIG. 5 illustrates the portion where the recess S2 is provided by a dotted line. The recesses S2 form gaps between the rotor shaft 11 and the rotor core 12. The recesses S2 are disposed between the respective pairs of inwardly projecting portions 122a and 122b included as the shaft holding portion 122.

The recesses S1 and S2 of the rotor core 12 are provided to extend to an outside of a virtual circle C in the radial direction of the rotor core 12 in the cross section perpendicular to the rotation axis, and the virtual circle C is a circle that connects contact points p of the shaft holding portion 122 (the inwardly projecting portions 122a and 122b) to the first outer circumferences 111 and is concentric with the rotor shaft 11. In other words, distances between most depressed portions of the recesses S1 and S2 and the center of the rotor shaft 11 is longer than the radius of the virtual circle C.

Furthermore, a core positioning portion 123 inwardly extending in the radial direction is disposed between the different shaft holding portions 122 (FIG. 4) so as to divide the gap formed by the recess S1 in the circumferential direction of the rotor core 12. A core positioning portion 123 inwardly extending in the radial direction is disposed between the inwardly projecting portions 122a and 122b of the respective pairs (FIG. 5) so as to divide the gap formed by the recess S2 in the circumferential direction of the rotor core 12. The core positioning portions 123 determine the position in the radial direction of the rotor core 12 with respect to the rotor shaft 11.

In this embodiment, the core positioning portions 123 are disposed every 45 degrees in the circumferential direction, and the positioning of the rotor shaft 11 is performed by the totally four core positioning portions 123. However, the number of the core positioning portions 123 is not limited to this, and for example, the positioning of the rotor shaft 11 may be performed by the two core positioning portions 123 while the respective core positioning portions 123 are disposed at axially symmetrical positions with respect to the center of the rotor shaft 11.

The rotor 1 for the rotating electrical machine according to the embodiment is configured as described above, and the following describes the effects provided by the embodiment.

First, with the shaft holding portion 122 formed on the inner peripheral portion of the rotor core 12, the first outer circumference 111 of the rotor shaft 11 is held from both sides in the circumferential direction, thereby achieving torque transmission between the rotor shaft 11 and the rotor core 12 by the rigidity of the shaft holding portion 122. Accordingly, the rotor shaft 11 can be downsized in diameter compared with a case where the torque transmission is achieved by only shrinkage fastening of the rotor core, thus ensuring promotion of downsizing the entire rotor 1.

Furthermore, the shaft holding portion 122 is non-contact with the second outer circumference 112 of the rotor shaft 11 in the state where the rotor core 12 is secured to the outer periphery of the rotor shaft 11, thus ensuring suppressing application of a stress in securing the rotor core 12 to the rotor shaft 11 in the radial direction of the rotor core 12 via the shaft holding portion 122. Accordingly, the stress on the outer periphery of the rotor core 12 during high rotation of the rotor 1 can be reduced. For example, the stress applied to the permanent magnet insertion hole 12h, especially the corner portion of the outer periphery of the rotor core 12 forming flux barrier can be reduced to enhance the durability of the rotor core 12.

Second, by forming the recesses S1 and S2 to the rotor core 12 between the different shaft holding portions 122 (FIG. 4) and between the inwardly projecting portions 122a and 122b of the respective pairs (FIG. 5), respectively, the deformation of the shaft holding portion 122 (the inwardly projecting portions 122a and 122b) in securing the rotor core 12 to the rotor shaft 11 is encouraged in the circumferential direction of the rotor core 12, thus ensuring suppressing application of the stress in the radial direction with more certainty to further reduce the stress on the outer periphery of the rotor core 12 during the high rotation. Here, by providing the recesses S1 and S2 to extend to the outside in the radial direction of the virtual circle C connecting the contact points p of the inwardly projecting portions 122a and 122b to the first outer circumferences 111 in the cross section perpendicular to the rotation axis, the above-described effect is more remarkably provided.

Third, the core positioning portion 123 is disposed to the rotor core 12 separately from the shaft holding portion 122, thus reducing an influence of the deformation of the shaft holding portion 122 on the positioning of the rotor core 12 to ensure suppressing occurrence of imbalance in rotation of the rotor 1.

The following describes other embodiments of the present invention.

Figure 6:
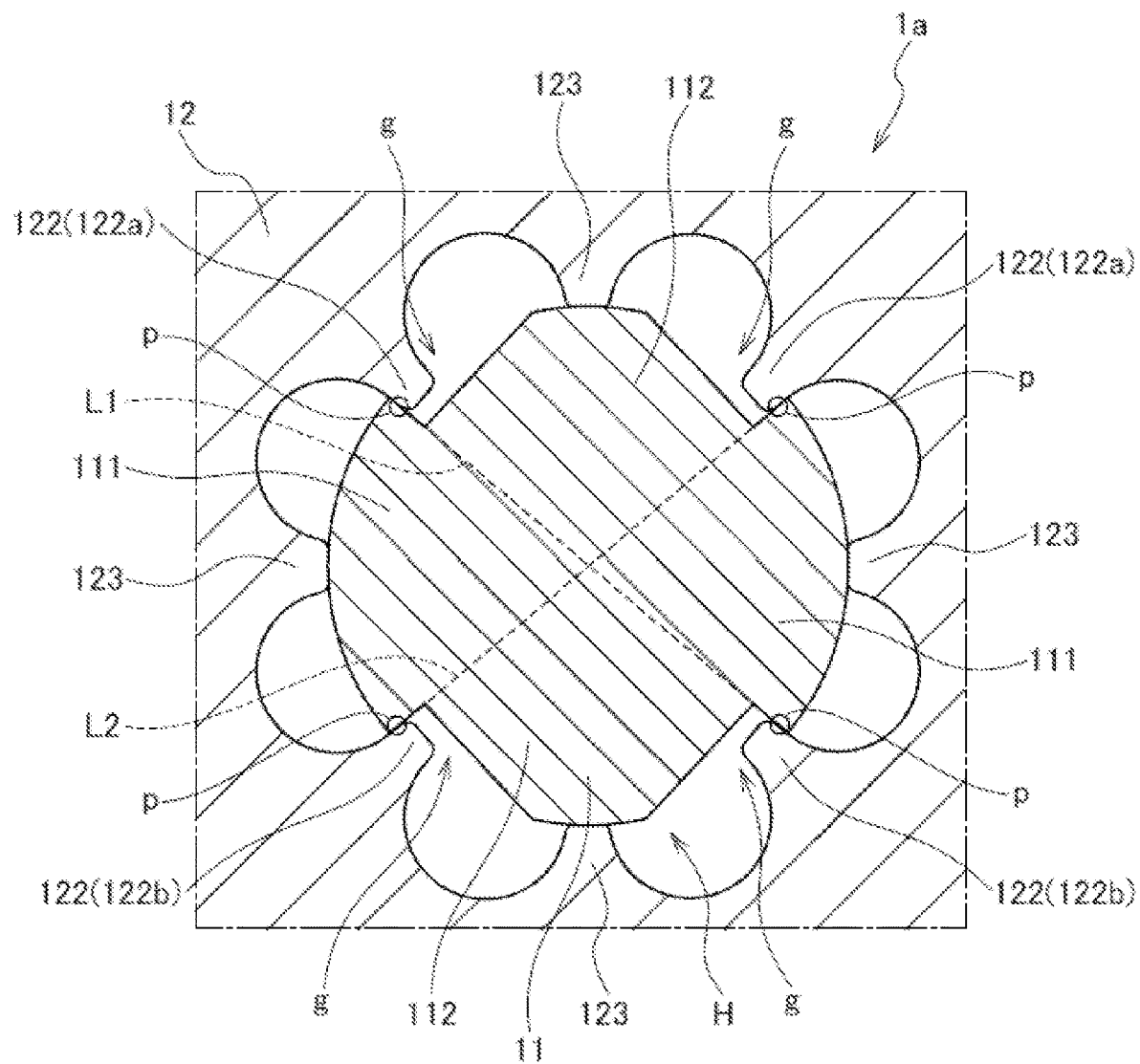
FIG. 6 is a partial cross-sectional view similar to FIG. 3 schematically illustrating a characteristic of a rotor for a rotating electrical machine according to another embodiment of the present invention.

FIG. 6 is an enlarged cross-sectional view, similar to FIG. 3, schematically illustrating a configuration of a rotor 1*a* for a rotating electrical machine according to another embodiment of the present invention.

Differences from the above-described embodiment (FIG. 3) will be mainly described. In the above-described embodiment, in the cross section perpendicular to the rotation axis, tangent lines (a pair of tangent lines L1 and L2 are determined for each shaft holding portion 122) on the rotor shaft 11 at the contact points p of the inwardly projecting portions 122*a* and 122*b* of the respective pairs to the first outer circumferences 111 are mutually parallel. In contrast, in this embodiment, the shape of the rotor shaft 11 is different from that in the above-described embodiment, and similarly determined pair of tangent lines L1 and L2 intersect with one another and especially pass through the center of the rotor shaft 11. FIG. 6 illustrates the tangent lines L1 and L2 by dotted lines. In this embodiment, since the rotor core 12 has the configuration with rotational symmetry, the tangent lines determined for the inwardly projecting portions 122*a* and 122*b*, which are diagonal with respect to the center of the rotor shaft 11, match or overlap.

Thus, by forming the rotor shaft 11 in the shape where the tangent lines L1 and L2 on the rotor shaft 11 at the contact points p of the inwardly projecting portions 122*a* and 122*b* of the respective pairs to the first outer circumferences 111 intersect with one another, the deformation of the inwardly projecting portions 122*a* and 122*b* in securing the rotor core 12 to the rotor shaft 11 can be actively caused in the circumferential direction of the rotor core 12. Accordingly, application of the stress in securing in the radial direction of the rotor core 12 is suppressed, thus ensuring reduction of the stress on the outer periphery of the rotor core 12 during the high rotation.

Furthermore, since directions of the deformations of the inwardly projecting portions 122*a* and 122*b* in securing the rotor core 12 (that is, directions perpendicular to the tangent lines L1 and L2) are perpendicular to directions of centrifugal forces generated on the inwardly projecting portions 122*a* and 122*b* (in this embodiment, directions of the tangent lines L1 and L2), engagement allowance of the inwardly projecting portions 122*a* and 122*b* with the first outer circumferences 111 can be ensured even under the high rotation, thus ensuring suppressing reduction of a holding force of the rotor core 12 on the rotor shaft 11.

Figure 7:
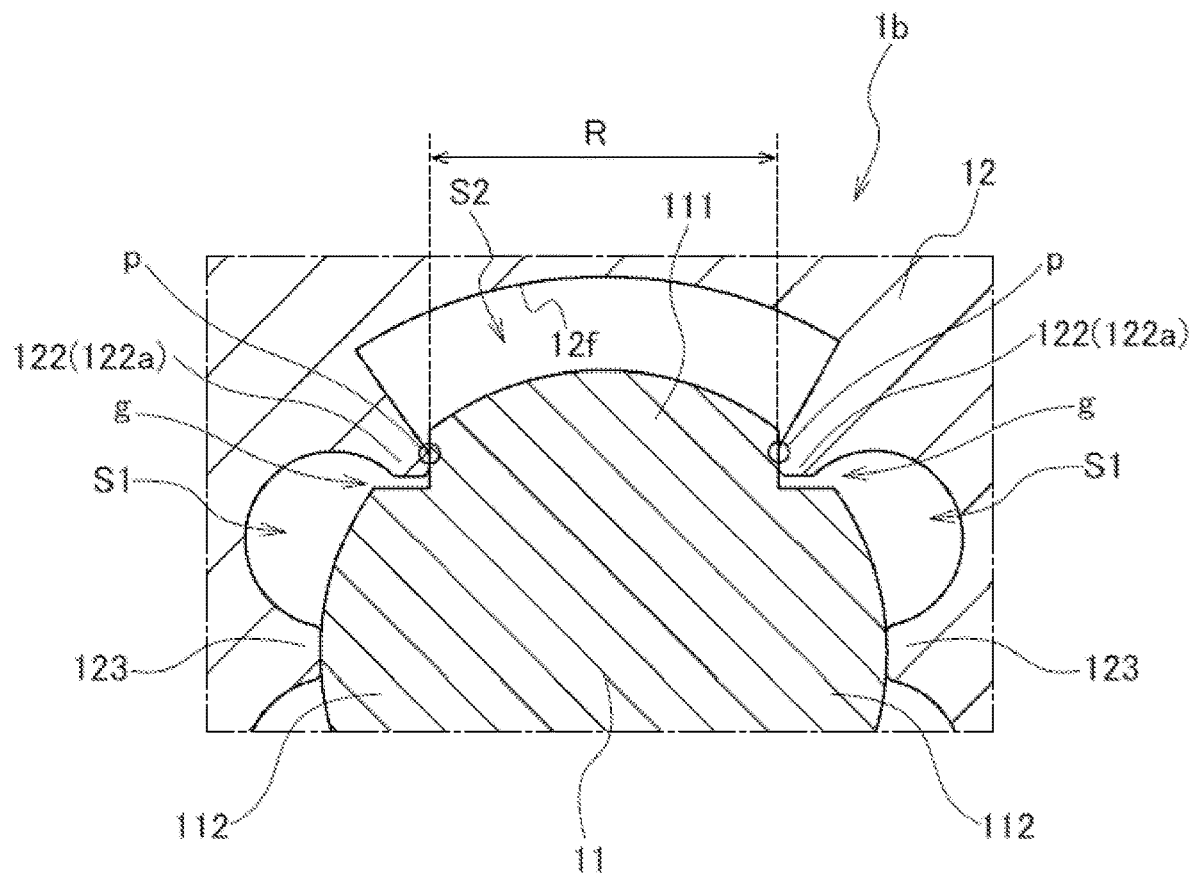
FIG. 7 is a partial cross-sectional view similar to FIG. 5 schematically illustrating a characteristic of a rotor for a rotating electrical machine according to yet another embodiment of the present invention.

FIG. 7 is an enlarged cross-sectional view, similar to FIG. 5, schematically illustrating a configuration of a rotor 1*b* for a rotating electrical machine according to yet another embodiment of the present invention.

Differences from the above-described embodiment (FIG. 5) will be mainly described. Since the core positioning portions 123 are disposed between the inwardly projecting portions 122*a* and 122*b*, the inner circumference surface of the rotor core 12 between the inwardly projecting portions 122*a* and 122*b* has a relatively large curvature in the cross section perpendicular to the rotation axis. In contrast, in this embodiment, the shape of the rotor core 12, especially its inner peripheral surface 12*f* is different from that in the above-described embodiment. The inner peripheral surface 12*f* of the rotor core 12 has an arc shape projecting outward in the radial direction of the rotor core 12 between the inwardly projecting portions of each pair (FIG. 7 illustrates the inwardly projecting portions 122*a* of the one pair).

Furthermore, in this embodiment, the inner peripheral surface 12*f* of the rotor core 12 between the inwardly projecting portions 122*a* (122*b*) extends to exceed a range R, which is defined in the circumferential direction of the rotor core 12 by a pair of tangent lines at the contact points p of the inwardly projecting portions 122*a* (122*b*) to the first outer circumference 111, to both sides in the circumferential direction in the cross section illustrated in FIG. 7.

Thus, by forming the inner peripheral surface 12*f* of the rotor core 12 between the inwardly projecting portions 122*a* (122*b*) in the arc shape, a length of the inner peripheral surface 12*f* can be extended in the circumferential direction, thus ensuring dispersing a stress (tensile stress) generated on bases of the inwardly projecting portions 122*a* and 122*b* in securing the rotor core 12.

Furthermore, by extending the inner peripheral surface 12*f* of the rotor core 12 exceeding the range R, the length of the inner peripheral surface 12*f* can be further extended, thus ensuring more widely dispersing the stress on the inwardly projecting portions 122*a* and 122*b*.

In the above description, for convenience of manufacturing the rotor core 12 and the like, the configuration of the rotor shaft 11 and the rotor core 12, specifically, the arrangement of the first outer circumference 111, the second outer circumference 112, the shaft holding portion 122, and the core positioning portion 123 is provided with the rotational symmetry or periodicity. That is, in the manufacture of the rotor core 12, while the electromagnetic steel plate is rotated every appropriate number of the electromagnetic steel plates in laminating the electromagnetic steel plates (this is referred to as "rotary lamination" in some cases) in consideration of variation generated in dimension and magnetic property corresponding to the portion of the roll material punching the electromagnetic steel plate, providing the rotational symmetry to the configuration of the rotor shaft 11 and the like allows the use of a common electromagnetic steel plate regardless of the direction in the lamination or a rotation position. However, the configuration of the rotor shaft 11 and the like is not limited to this, and the configuration without the rotational symmetry may be employed. For example, for the rotor shaft 11, the first outer circumference 111 and the second outer circumference 112 are differed in range extending in the circumferential direction, or for the rotor core 12, the inner peripheral surface between the different shaft holding portions 122 (FIG. 4) and the inner peripheral surface between the inwardly projecting portions 122*a* and 122*b* in the respective pairs (FIG. 5) are differed in shape of the cross section.

Furthermore, in the configuration of the above description, the rotor core 12 includes the shaft holding portion 122, and the engaging portions (that is, the first outer circumferences 111) of the outer periphery of the rotor shaft 11 are held by the pairs of the inwardly projecting portions 122*a* and 122*b* included as the shaft holding portion 122. However, the relation between the holding portion and the engaging portion is not limited to this. The relation between both sides can be interchanged to dispose the holding portion on the rotor shaft 11 and dispose the engaging portion on the rotor core 12.

Specifically, a core holding portion including at least a pair of outwardly projecting portions is disposed on the outer peripheral portion of the rotor shaft while an engaging portion with which the core holding portion is engaged is disposed on the inner peripheral portion of the rotor core forming a shaft insertion hole. The outwardly projecting portions of each pair are disposed to be separated from one another in the circumferential direction of the rotor shaft, and the engaging portion of the rotor core inner periphery is engaged between the outwardly projecting portions of each pair. Here, the outwardly projecting portions of each pair are non-contact with the rotor core on the opposite side of the engaging portion in the circumferential direction.

While the embodiments of the present invention are described above, the above-described embodiments describe merely a part of application examples of the present invention and the gist does not limit the technical scope of the present invention to the specific configuration of the embodiments. Various changes and modifications can be made on the embodiments described above in the scope of the matters described in the claims.

The invention claimed is:

1. A rotor for a rotating electrical machine, comprising:
a rotor shaft; and
a rotor core fixedly supported to an outer periphery of the rotor shaft, wherein
the rotor shaft includes a first outer circumference and a second outer circumference on a cross section perpendicular to a rotation axis, the first outer circumference projecting in a radial direction of the rotor shaft, the second outer circumference being arranged in a circumferential direction of the rotor shaft with respect to the first outer circumference, and the second outer circumferences being disposed alternately with the first outer circumference,
the rotor core includes a core insertion hole into which the rotor shaft is inserted and a shaft holding portion on an inner peripheral portion on which the core insertion hole is formed, the shaft holding portion configured to hold the first outer circumference from both sides in the circumferential direction of the rotor shaft,
the rotor shaft has tangent lines mutually parallel in the cross section perpendicular to the rotation axis, the tangent lines being at contact points of the shaft holding portion to the first outer circumferences on both sides in the circumferential direction, and
the shaft holding portion is in a state of being pushed by the first outer circumference in a direction where contact points to the first outer circumference on both sides in the circumferential direction separate from one another, and the shaft holding portion is non-contact with the second outer circumference.

2. The rotor for the rotating electrical machine according to claim 1, wherein a gap is provided between the shaft holding portion and the second outer circumference, the gap being configured to allow deformation of the shaft holding portion in a direction approaching the second outer circumference.

3. The rotor for the rotating electrical machine according to claim 1, wherein the rotor shaft includes a plurality of the first outer circumferences, and
the shaft holding portion is formed as inwardly projecting portions of the inner peripheral portion of the rotor core, and a recess of the rotor core is formed between the shaft holding portions that hold the first outer circumferences adjacent to one another in the circumferential direction.

4. The rotor for the rotating electrical machine according to claim 3, wherein the recess extends to an outside of a virtual circle in a radial direction of the rotor core in the cross section perpendicular to the rotation axis, the virtual circle being a circle connecting contact points of the inwardly projecting portions to the first outer circumference, and the virtual circle being concentric with the rotor shaft.

5. The rotor for the rotating electrical machine according to claim 3, wherein the rotor core forms a gap with the rotor shaft by the recess, the rotor core further includes a core positioning portion that extends to divide the gap in a circumferential direction of the rotor core, the core positioning portion configured to determine a position of the rotor core with respect to the rotor shaft in the radial direction.

6. The rotor for the rotating electrical machine according to claim 1, wherein the shaft holding portion includes a pair of the inwardly projecting portions disposed on the inner peripheral portion of the rotor core, and a recess of the rotor core is formed between the pair of inwardly projecting portions.

7. The rotor for the rotating electrical machine according to claim 1, wherein the shaft holding portion includes a pair of inwardly projecting portions disposed on the inner peripheral portion of the rotor core, and
an inner peripheral surface of the rotor core between the pair of inwardly projecting portions has an arc shape projecting outward in the radial direction of the rotor core in the cross section perpendicular to the rotation axis.

8. The rotor for the rotating electrical machine according to claim 7, wherein the inner peripheral surface of the rotor core extends to exceed a range defined in the circumferential direction by tangent lines at contact points of the pair of inwardly projecting portions to the first outer circumference in the cross section perpendicular to the rotation axis.

9. A rotor core support structure for a rotating electrical machine, the rotor core support structure fixedly supporting a rotor core to an outer periphery of a rotor shaft, wherein
the rotor core has a shaft insertion hole into which the rotor shaft is inserted and a shaft holding portion on an inner peripheral portion on which the shaft insertion hole is formed, the shaft holding portion including at least a pair of inwardly projecting portions, the inwardly projecting portions of each pair being disposed to be separated from one another in a circumferential direction,
the rotor shaft includes an engaging portion on an outer peripheral portion of the rotor shaft, the engaging portion being engaged between the inwardly projecting portions of each pair,
the rotor shaft further has tangent lines mutually parallel in the cross section perpendicular to the rotation axis of the rotor shaft, the tangent lines being at contact points on both sides in the circumferential direction, and the contact points being contact points of the respective inwardly projecting portions of each pair to the engaging portion, and
the inwardly projecting portions of each pair are in a state of being pushed by the engaging portion in a direction where contact points to the engaging portion on both sides in the circumferential direction separate from one another, and the inwardly projecting portions of each pair are non-contact with the rotor shaft on an opposite side of the engaging portion in the circumferential direction.

10. The rotor core support structure for the rotating electrical machine according to claim 9, wherein a gap is provided between the inwardly projecting portion and the rotor shaft, and the gap being configured to allow deformation in a direction where the inwardly projecting portions of each pair separate from one another.

* * * * *